(12) United States Patent
Hayashi et al.

(10) Patent No.: US 7,727,428 B2
(45) Date of Patent: Jun. 1, 2010

(54) METHOD FOR PRODUCING OPTICAL RECORDING MEDIUM

(75) Inventors: Kazuhiro Hayashi, Minamiashigara (JP); Shin Yasuda, Minamiashigara (JP); Makoto Furuki, Minamiashigara (JP); Katsunori Kawano, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 46 days.

(21) Appl. No.: 12/172,657

(22) Filed: Jul. 14, 2008

(65) Prior Publication Data

US 2009/0121390 A1    May 14, 2009

(30) Foreign Application Priority Data

Nov. 13, 2007    (JP) .............................. 2007-294947

(51) Int. Cl.
| | |
|---|---|
| *G03H 1/04* | (2006.01) |
| *G11B 3/70* | (2006.01) |
| *G01B 11/00* | (2006.01) |
| *G11B 7/26* | (2006.01) |

(52) U.S. Cl. ....................... 264/1.33; 264/2.7; 264/411; 264/289.6; 425/810; 369/283

(58) Field of Classification Search ................. 264/1.33, 264/219, 403, 411, 225, 289.3, 289.6, 2.7; 369/283; 425/384, 394, 403, 810, 385
See application file for complete search history.

(56) References Cited

U.S. PATENT DOCUMENTS

| 6,676,791 | B1* | 1/2004 | Kondo et al. ................. 156/209 |
|---|---|---|---|
| 6,934,244 | B2* | 8/2005 | Tanaka et al. ............. 369/275.4 |
| 7,008,282 | B2* | 3/2006 | Kawase et al. ................. 445/24 |
| 7,161,893 | B2* | 1/2007 | Yamaga et al. ........... 369/275.4 |
| 7,396,562 | B2* | 7/2008 | Hisada et al. ................ 427/240 |
| 2002/0075795 | A1* | 6/2002 | Yamasaki et al. ........... 369/283 |
| 2005/0156339 | A1* | 7/2005 | Nakano et al. ............. 264/1.33 |
| 2005/0259562 | A1* | 11/2005 | Tomiyama et al. .......... 369/283 |
| 2006/0257747 | A1* | 11/2006 | Nagate .......................... 430/1 |

FOREIGN PATENT DOCUMENTS

JP    2006-259271 A    9/2006

* cited by examiner

*Primary Examiner*—Joseph S Del Sole
*Assistant Examiner*—Nahida Sultana
(74) *Attorney, Agent, or Firm*—Sughrue Mion, PLLC

(57) ABSTRACT

A method for producing an optical recording medium, includes: filling a plurality of spaces with a liquid photosensitive material, wherein each of the plurality of spaces is surrounded by a surface of a sheet material and partition walls that are formed on the surface of the sheet material for separating a plurality of recording areas, and the surface of the sheet material has recessed parts at positions where the plurality of recording areas is to be formed, each of the recessed parts protruding and deformed to a back surface side of the sheet material so as to have a volume in relation to a volumetric shrinkage factor of the photosensitive material; and pressing a member having a substantially flat surface to a back surface of the sheet material to make the recessed parts substantially flat and heating and hardening the photosensitive material to form the plurality of recording areas.

6 Claims, 5 Drawing Sheets

US 7,727,428 B2

METHOD FOR PRODUCING OPTICAL RECORDING MEDIUM

CROSS-REFERENCE TO RELATED APPLICATION

This application is based on and claims priority under 35 USC §119 from Japanese Patent Application No. 2007-294947 filed Nov. 13, 2007.

BACKGROUND (i) Technical Field

The present invention relates to a method for producing an optical recording medium.

(ii) Related Art

For instance, in the technique of a hologram recording, an optical recording medium including a recording area composed of a photosensitive material is irradiated with signal light corresponding to information desired to be recorded on the recording medium to generate a photo-reaction in the photosensitive material so that the information is recorded. The optical recording medium used in such a technique may occasionally have a plurality of recording areas mutually separated by partition walls. Thus, the plurality of recording areas can each independently record the information without receiving an influence of the photo-reaction arising in other recording areas.

When a liquid photosensitive material is hardened to form the recording areas, a volumetric shrinkage ordinarily arises in the photosensitive material to decrease its volume. Accordingly, even when the surface of the liquid photosensitive material is flat, the surfaces of the recording areas may not be possibly flattened due to the influence of the volumetric shrinkage when the photosensitive material is hardened. If irregularities are generated in the surfaces of the recording areas, when the recording areas irradiated with a light, the irradiation of the light may give an adverse effect to an accuracy for recording and reproducing information owing to a factor that the applied light is scattered.

SUMMARY

According to an aspect of the invention, there is provided a method for producing an optical recording medium, including:

filling a plurality of spaces with a liquid photosensitive material, wherein each of the plurality of spaces is surrounded by a surface of a sheet material and partition walls that are formed on the surface of the sheet material for separating a plurality of recording areas, and the surface of the sheet material has recessed parts at positions where the plurality of recording areas is to be formed, each of the recessed parts protruding and deformed to a back surface side of the sheet material so as to have a volume in relation to a volumetric shrinkage factor of the photosensitive material; and pressing a member having a substantially flat surface to a back surface of the sheet material to make the recessed parts substantially flat and heating and hardening the photosensitive material to form the plurality of recording areas.

BRIEF DESCRIPTION OF THE DRAWINGS

Embodiments of the present invention will be described in detail based on the following figures, wherein.

DETAILED DESCRIPTION

Figure 1:
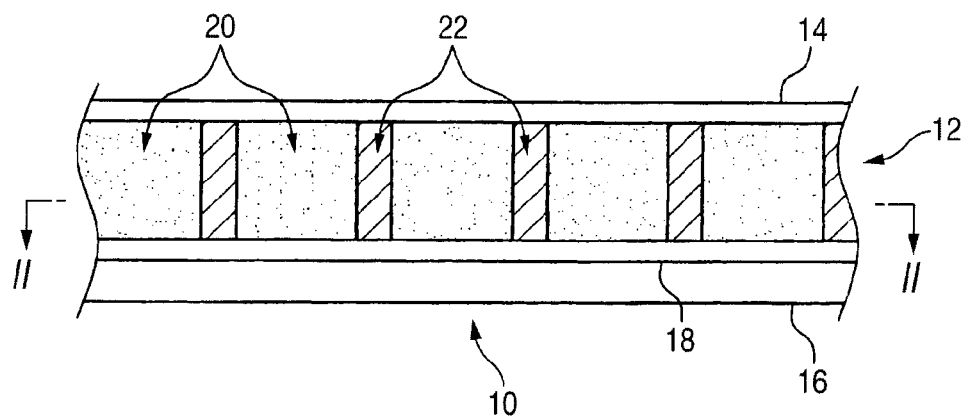
FIG. 1 is a partly sectional view showing an exemplary embodiment of an optical recording medium produced by a method for producing an optical recording medium according to an exemplary embodiment of the present invention.

Now, an exemplary embodiment of the present invention will be described by referring to the drawings.

Initially, a structure of an optical recording medium 10 produced by a method for producing an optical recording medium according to an exemplary embodiment of the present invention will be described. The optical recording medium 10 is a plate shaped medium and includes a plurality of layers. An entire shape of the optical recording medium 10 may be a disc shape, a card type or other forms.

FIG. 1 is a partly sectional view showing a part of a section obtained by cutting the optical recording medium 10 along a direction of its thickness. As shown in FIG. 1, the optical recording medium 10 includes a recording layer 12 at a central part, a protecting sheet 14 for covering the surface of the optical recording medium 10, and a substrate 16 for covering a back surface of the optical recording medium. Further, between the recording layer 12 and the substrate 16, a sheet material 18 is arranged.

Figure 2:
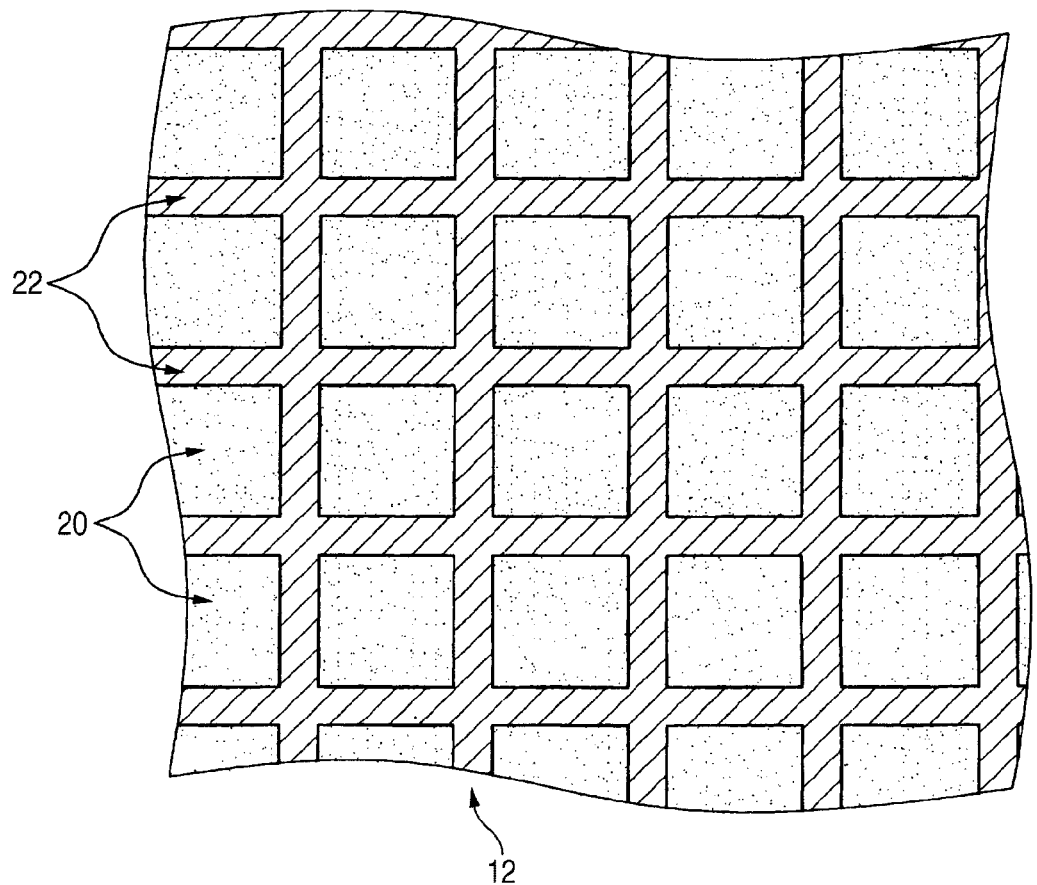
FIG. 2 is a partly sectional view showing an exemplary embodiment of a recording layer in the optical recording medium produced by the method for producing the optical recording medium according to the embodiment.

The recording layer 12 is a layer having the thickness of, for instance, about 1 mm to 1.5 mm and including a plurality of recording areas 20 containing a photosensitive material and partition walls 22 for separating the plurality of recording areas 20 from one another. FIG. 2 is a partly sectional view showing a part of a section obtained by cutting the recording layer 12 vertically to the direction of the thickness of the optical recording medium 10. In an embodiment shown in FIG. 2, the partition walls 22 are configured in the shape of a lattice viewed from the surface of the optical recording medium 10. The recording areas 20 each are mutually separated by the partition walls 22. The recording areas 20 each form rectangular parallelepiped areas having rectangular bottom surfaces of a size of, for instance, about 500 μm to 1 mm or so in each side. The shape of the recording area is not limited to the above-described shape, and the recording area 20 may be, for instance, a cylindrical area having a circular bottom surface or an angular column area having a hexagonal bottom surface.

The recording area 20 is formed with the photosensitive material. The photosensitive material is a material of a composition including a photopolymer that reacts with, for instance, light to be polymerized. In this embodiment, the photosensitive material is hardened when the photosensitive material is heated under a liquid state. The photosensitive material has a property that its volume shrinks at the time of a thermosetting process. Further, the partition wall 22 may be formed with an arbitrary material, for instance, polycarbonate.

Both the protecting sheet 14 and the substrate 16 are formed with a transparent material that transmits light. Further, the protecting sheet 14 is formed with a flexible material. Specifically, the protecting sheet 14 may be, for instance, a thin polycarbonate film, a TAC (Triacetylcellulose) film, a ZEONOA film (Registered Trademark) or the like. Further, the substrate 16 is a plate shaped member formed with, for instance, polycarbonate.

The sheet material 18 is a film shaped member having a thickness of, for instance, 100 μm or smaller and is formed with a transparent material that transmits light like the protecting sheet 14 or the substrate 16. Further, the sheet material 18 has an elasticity and such a property that when the sheet material 18 is pressed to change its shape, the sheet material 18 maintains the changed shape for a time as described below. Specifically, the sheet material 18 may be, for instance, the TAC film or the ZEONOA film or the like. In a below-description, a surface of the sheet material 18 that comes into contact with the recording layer 12 is designated as a front surface (or simply as a surface) of the sheet material 18 and a surface of the sheet material 18 that comes into contact with the substrate 16 is designated as a back surface.

A method for producing the above-described optical recording medium 10 will be described below. A method for producing the optical recording medium 10 according to this embodiment includes a sheet material deforming process, a partition wall forming process, a photosensitive material filling process, a protecting sheet arranging process and a photosensitive material hardening process. Now, these processes are respectively described below.

Figure 3:
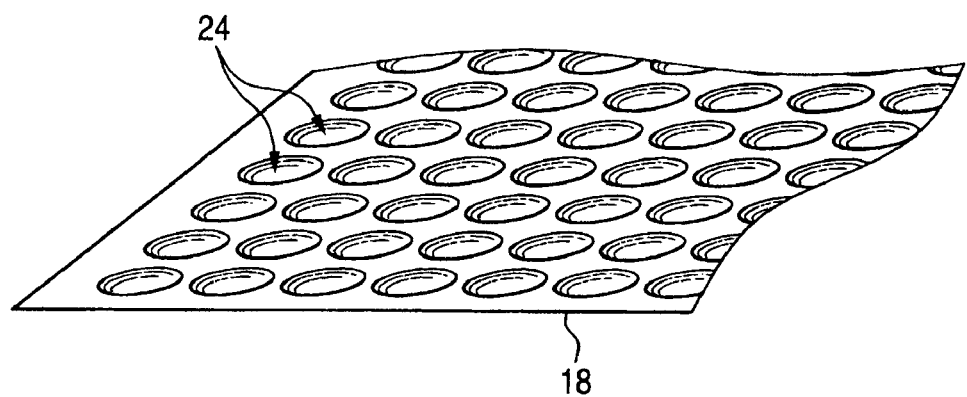
FIG. 3 is a partly perspective view showing an exemplary embodiment of a sheet material having recessed parts provided by a sheet material deforming process.
Figure 4:
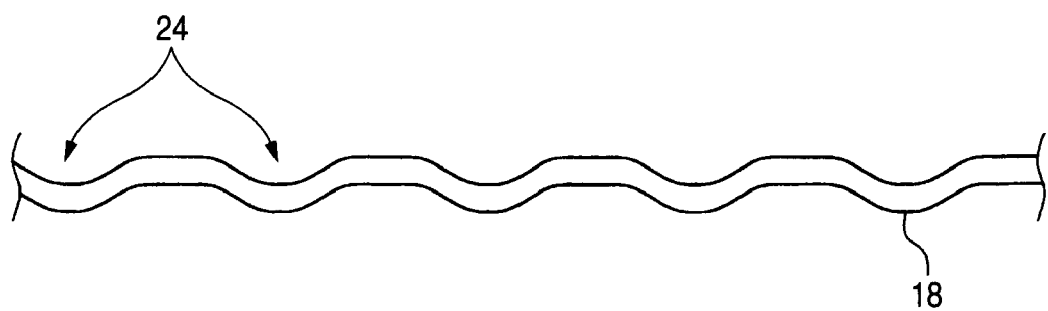
FIG. 4 is a partly sectional view showing the shape of the sheet material having the recessed parts provided by the sheet material deforming process.

Initially, in the sheet material deforming process, a plurality of recessed parts 24 are provided in the front surface of the sheet material 18. Specifically, positions corresponding to the respective recording areas 20 on the front surface of the sheet material 18 are pressed to protrude and are deformed to the back surface side. Thus, the recessed parts 24 are formed at the positions of the front surface of the sheet material 18 respectively corresponding to the positions of the recording areas 20. As an exemplary method for forming the recessed parts, for instance, a method can be exemplified in which positions of the sheet material are protruded and deformed to form the recessed parts 24 by a mold pressing for pressing a previously manufactured mold to the sheet material 18. FIG. 3 is a partly perspective view showing the sheet material 18 deformed by the sheet deforming process. Further, FIG. 4 is a partly sectional view showing a part of a section obtained by cutting along the direction of the thickness the deformed sheet material 18.

Here, the recessed parts 24 provided by the sheet material deforming process will be described below. The recessed part 24 has, for instance, a spherical shape. A central position of the recessed part 24 substantially corresponds to the central position of a bottom surface of a finally formed recording area 20. A volume V1 of a space formed by the recessed part 24 is determined on the basis of a volume V2 of each finally formed recording area 20 and a volumetric shrinkage factor α of the photosensitive material forming the recording area 20. Here, the volumetric shrinkage factor α represents a ratio of a volume that decreases when the photosensitive material in a liquid state shrinks during the thermosetting process to an original volume. Specifically, the shape of the recessed part 24 is determined in such a way that the volume V1 substantially corresponds to a value calculated by a below-described equation (1).

$$V1 = (\alpha/1-\alpha) \times V2 \tag{1}$$

Figure 5:
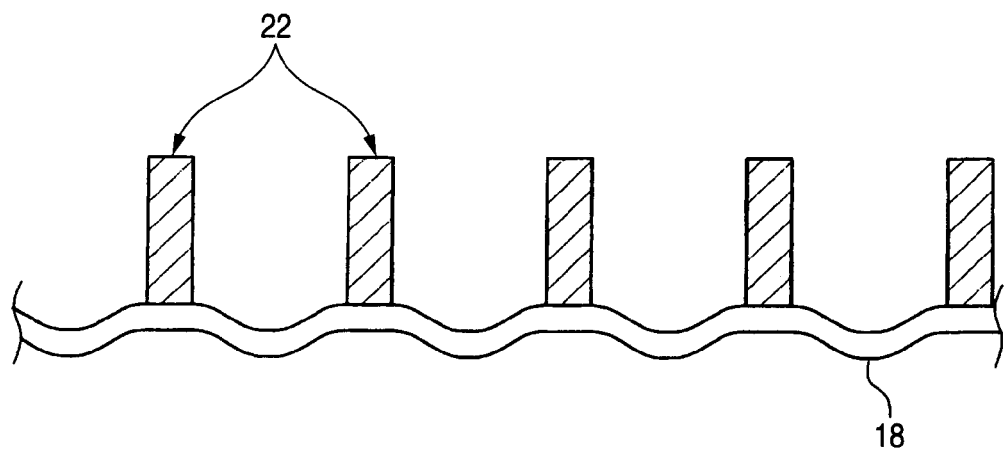
FIG. 5 is a partly sectional view showing a part of a section obtained by cutting along a direction of thickness the sheet material having partition walls formed by a partition wall forming process.

Then, in the partition wall forming process, the partition walls 22 for respectively separating the recording areas 20 are formed on the surface of the sheet material 18. Specifically, for instance, the partition walls 22 having the shape of a lattice are previously manufactured with the thickness corresponding to the thickness of the recording layer 12 by a molding process such as an injection molding and the manufactured partition walls 22 are bonded to the front surface of the sheet material 18. FIG. 5 is a partly sectional view showing a part of a section obtained by cutting along the direction of the thickness the sheet material 18 on which the partition walls 22 are formed by the partition wall forming process.

In this embodiment, the recessed parts 24 are provided on the front surface of the sheet material 18 by the sheet deforming process, and then, the partition walls 22 are formed on the front surface of the sheet material 18 by the partition wall forming process. However, the order of the two processes may be reversed. That is, after the partition walls 22 are formed on the front surface of the sheet material 18, the positions corresponding to the recording areas 20 respectively surrounded by the partition walls 22 of the sheet material 18 may be pressed to protrude and deformed to the back surface side to provide the recessed parts 24.

Then, in the photosensitive material filling process, a plurality of spaces (namely, areas where the recording areas 20 are to be formed) respectively surrounded by the surface of the sheet material 18 and the partition walls 22 are filled with the photosensitive material in the liquid state. The spaces are filled with the photosensitive material by using, for instance, a dispenser or the like.

Figure 6:
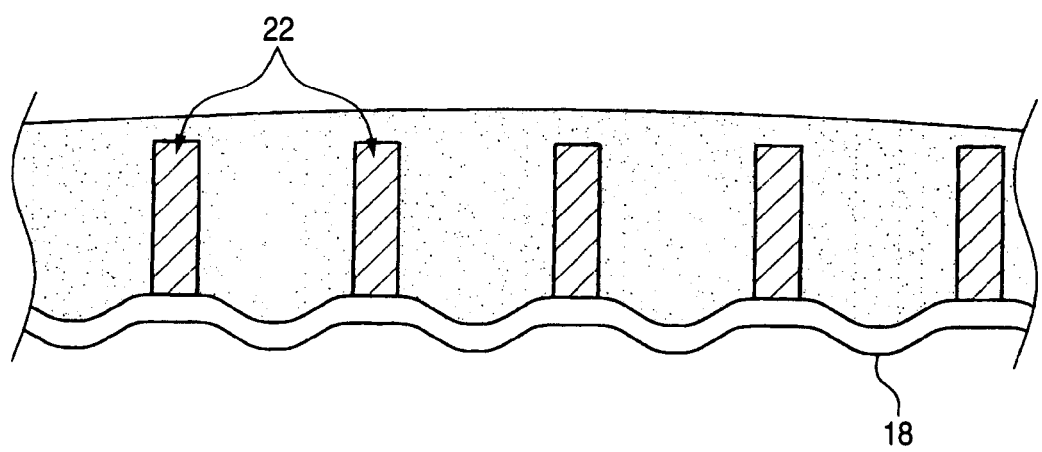
FIG. 6 is a diagram showing a state that the sheet material having the partition walls formed is filled with a photosensitive material by a photosensitive material filling process.

At this time, a quantity of the supplied photosensitive material is adjusted so as to be more than the capacity (V1+V2) of the spaces surrounded by the surface of the sheet material 18 and the partition walls 22. That is, the photosensitive material is supplied to a height exceeding the upper ends of the partition walls 22 (end faces opposite to a side in contact with the front surface of the sheet material 18). The photosensitive material is supplied in such a way, because bubbles are prevented from entering parts between the protecting sheet 14 and the photosensitive material forming the recording areas 20 in a below-described protecting sheet arranging process. FIG. 6 is a diagram showing a state that the photosensitive material is supplied to the sheet material 18 on which the partition walls 22 shown in FIG. 5 are formed by the photosensitive material filling process.

Then, in the protecting sheet arranging process, the protecting sheet 14 is arranged for covering the upper ends of the partition walls 22 formed by the partition wall forming process and the photosensitive material in the liquid state supplied in the photosensitive material filling state. Specifically, the part of the photosensitive material supplied in the photosensitive material filling process that exceeds the upper ends of the partition walls 22 is pushed out from one end to the other end of the sheet material 18 to allow the protecting sheet 14 to come into tight contact with the upper ends of the partition walls 22 to arrange the protecting sheet 14.

Figure 7A:
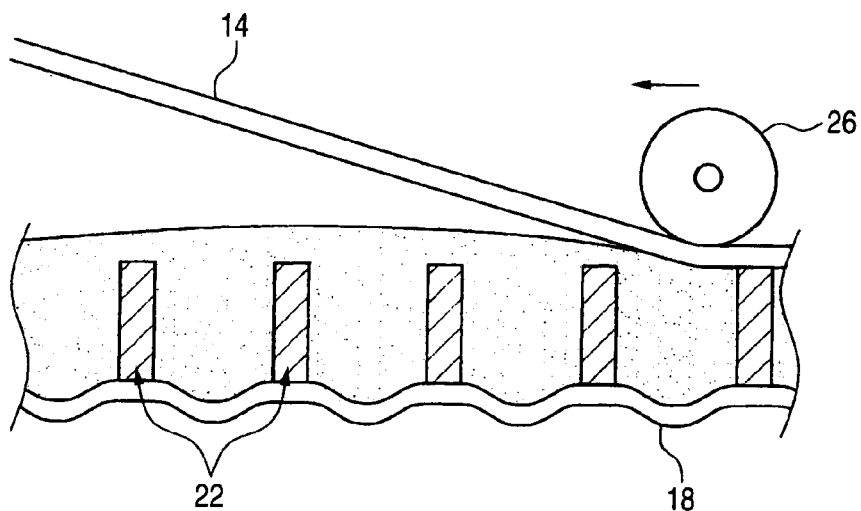
FIGS. 7A-7C illustrate diagrams showing processes for arranging a protecting sheet by a roller in a protecting sheet arranging process.

Now, an exemplary embodiment of the protecting sheet arranging process will be described below. Initially, as shown in FIG. 7A, while one end of the protecting sheet 14 is raised, a roller 26 is arranged so that the protecting sheet 14 is sandwiched in between the roller 26 and the upper end surface of the partition wall 22. At this time, the roller 26 is arranged at one end of the sheet material 18 on which the partition walls 22 are formed. Since the protecting sheet 14 has the flexibility as described above, the protecting sheet 14 may be arranged in a bending state along the surface of the roller 26 as shown in FIG. 7A.

Figure 7B:
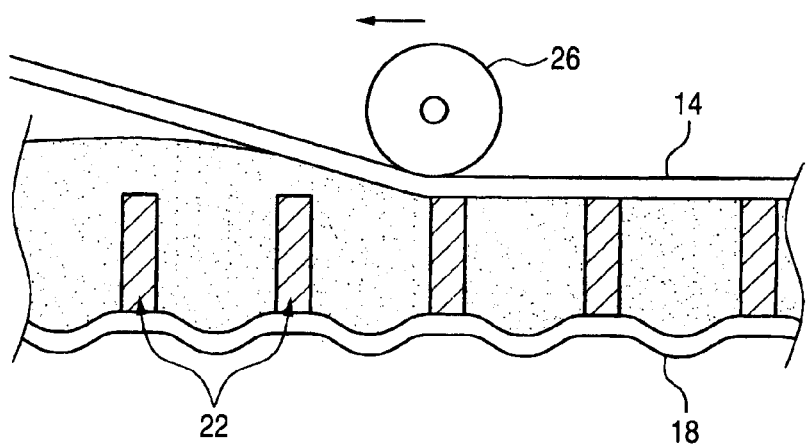

Then, under a state shown in FIG. 7A, the roller 26 is rotated and moved from the one end to the other end of the sheet material 18 along a direction shown by an arrow mark in FIG. 7A (that is, a direction parallel to the sheet material 18). Thus, the protecting sheet 14 is pressed to the upper end surfaces of the partition walls 22 so that the part of the photosensitive material supplied in the photosensitive material filling process which exceeds the upper end surfaces of the partition walls 22 is pushed out toward the moving direction of the roller 26 and is allowed to come into tight contact with the upper end surfaces of the partition walls 22. At this time, since the photosensitive material is supplied to the height exceeding the upper end surfaces of the partition walls 22 in the photosensitive material filling process, the part of the protecting sheet 14 pressed by the roller 26 is allowed to constantly come into contact with the photosensitive material. Therefore, bubbles can be prevented from entering a part between the protecting sheet 14 and the photosensitive material. FIG. 7B shows a state that the protecting sheet 14 is stuck to the upper end surfaces of the partition walls 22 by the rotating movement of the roller 26 to cover the photosensitive material and the partition walls 22 therewith.

Figure 7C:
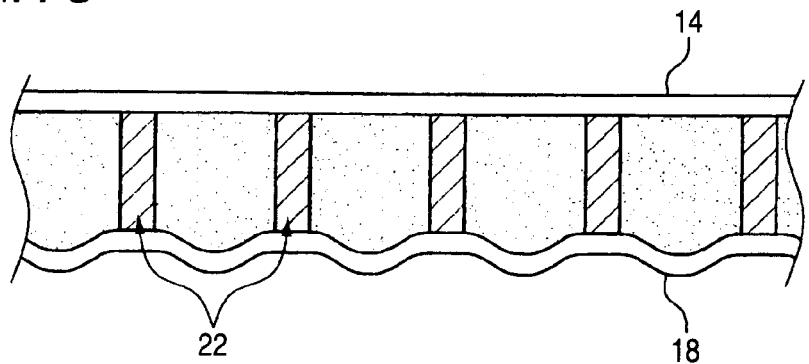

As described above, the roller 26 is moved so as to pass the entire surface of the sheet material 18 from the one end to the other end of the sheet material 18 on which the partition walls 22 are formed. Thus, as shown in FIG. 7C, the protecting sheet 14 can be flattened and the spaces surrounded by the protecting sheet 14, the surface of the sheet material 18 and the partition walls 22 can be filled with the photosensitive material without voids. The spaces surrounded and sealed by the protecting sheet 14, the surface of the sheet material 18 and the partition walls 22 each are referred to as cells C, hereinafter.

Figure 8A:
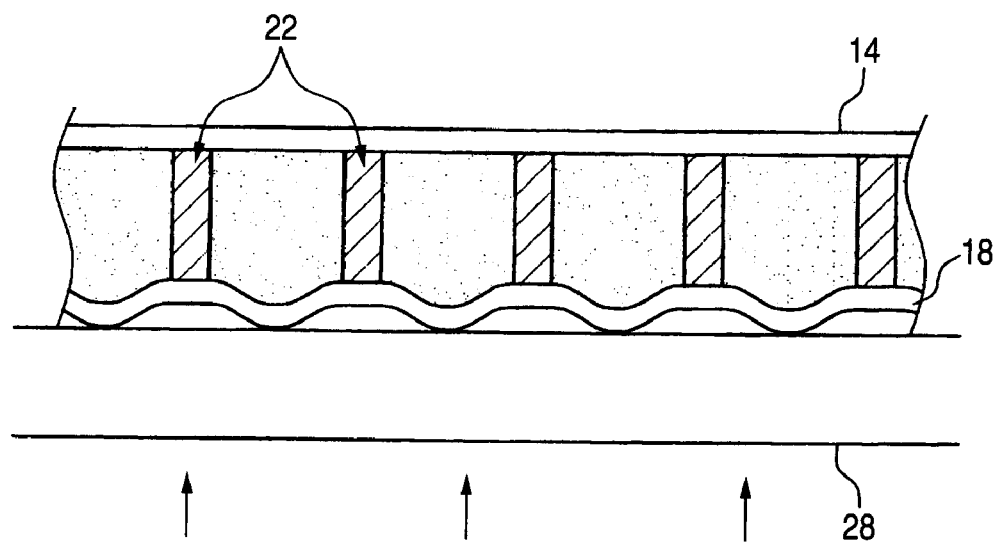
FIGS. 8A-8B illustrate diagrams showing a state that the recessed parts are made to be substantially flat by a photosensitive material hardening process.
Figure 8B:
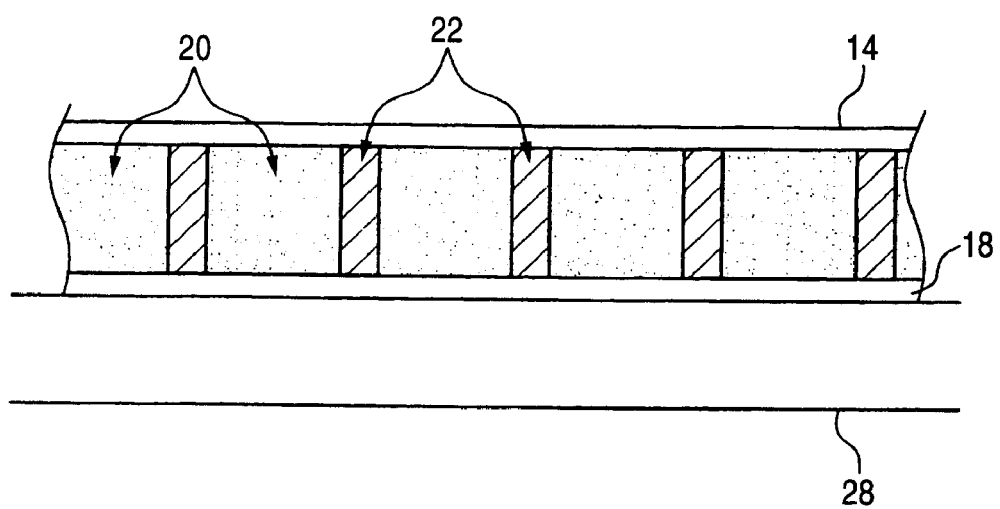

Then, in the photosensitive material hardening process, a support member 28 having a substantially flat surface is pressed to the back surface of the sheet material 18 to return the recessed parts 24 to substantially flat states and the photosensitive material is heated. Thus, the photosensitive material is hardened to form the recording areas 20. FIG. 8A shows a state that the support member 28 is pressed to the back surface of the sheet material 18 in the photosensitive material hardening process. An arrow mark in the drawing shows a direction for exerting a force upon the support member 28. Further, FIG. 8B shows a state that the recessed parts provided on the front surface of the sheet material 18 are made to be substantially flat in the photosensitive material hardening process.

As described above, when the photosensitive material hardening process is started, the cell C is filled with the photosensitive material without voids. The volume of the photosensitive material is represented by (V1+V2). In the photosensitive hardening process, the volume is decreased by (V1+V2)α by the thermosetting action of the photosensitive material. That is, when V1 satisfies the above-described equation (1), the volume of the photosensitive material with which each cell C is filled becomes V2 due to the shrinkage. Since V2 corresponds to the volume of the cell C after the recessed part 24 is made to be flat, the support member 28 is pressed to the back surface of the sheet material 18 little by little in accordance with a process that the thermosetting material shrinks by the thermosetting process to return the recessed part 24 substantially to the flat state, so that the photosensitive material can be hardened without generating voids in the cell C and the surface of the recording area 20 formed with the photosensitive material which comes into contact with the sheet material 18 can be substantially flattened. As described above, since the sheet material 18 has the elasticity, the sheet material can be returned substantially to the flat state by pressing the support member 28 thereto.

By the above-described processes, the recording areas 20 formed with the photosensitive material are formed so that both the surface coming into contact with the sheet material 18 and the surface coming into contact with the protecting sheet 14 are substantially flat and gaps are not formed between the sheet material 18, the protecting sheet 14 and the partition walls 22. Further, the substrate 16 is stuck to the back surface of the sheet material 18 so that the optical recording medium 10 shown in FIG. 1 is produced.

The structure of the optical recording medium 10 shown in FIG. 1 is merely exemplified, and the optical recording medium produced by the method for producing the optical recording medium according to the embodiment is not limited thereto. For instance, the substrate 16 may not be stuck to the sheet material 18 side, but to the protecting sheet 14 side of a semi-product composed of the protecting sheet 14, the recording layer 12 and the sheet material 18 that is formed by the above-described processes to produce an optical recording medium. Further, the substrate may be stuck to both the sheet material 18 side and the protecting sheet 14 side to produce an optical recording medium.

Further, when the photosensitive material can be hardened to form the recording areas 20 whose surfaces are flat by the above-described processes respectively, the sheet material 18 does not need to be necessarily included in the completed optical recording medium 10. Thus, after the recording areas 20 are formed by the photosensitive material hardening process, the sheet material 18 may be removed and the substrate 16 may be stuck to a position where the sheet material 18 has been provided to produce an optical recording medium. According to such a method, the optical recording medium composed of the protecting sheet 14, the recording layer 12 and the substrate 16 is produced. In this case, since the sheet material 18 is removed from the completed optical recording medium, the sheet material 18 used in the above-described producing process may not be necessarily made of a transparent material that transmits light.

What is claimed is:

1. A method for producing an optical recording medium, comprising:

filling a plurality of spaces with a liquid photosensitive material, wherein each of the plurality of spaces is defined by a front surface of a sheet material and partition walls that are formed on the front surface of the sheet material for separating a plurality of recording areas, and the front surface of the sheet material has recesses at positions where the plurality of recording areas is to be formed, each of the recesses having an associated convex portion which protrudes a back surface of the sheet material, and each of the recesses having a volume which is related to a volumetric shrinkage factor of the photosensitive material; and simultaneously pressing a member having a substantially flat surface to the back surface of the sheet material to make the convex portions substantially flat while heating and hardening the photosensitive material to form the plurality of recording areas.

2. A method for producing an optical recording medium, comprising:

pressing a front surface of a sheet material to form a plurality of recesses at positions of the front surface of the sheet material where a plurality of recording areas are to be formed, each of the recesses having an associated convex portion which protrudes from a back surface of the sheet material, and each of the recesses having a volume which is related to a volumetric shrinkage factor of a photosensitive material for the optical recording medium;

forming partition walls that separate the recording areas on the front surface of the sheet material;

filling a plurality of spaces defined by the front surface of the sheet material and the partition walls with the photosensitive material in liquid form; and simultaneously pressing a member having a substantially flat surface to the back surface of the sheet material to make the convex portions substantially flat while heating and hardening the photosensitive material to form the plurality of recording areas.

3. The method according to claim 1, wherein the filling of the plurality of spaces with the photosensitive material comprising:

supplying the photosensitive material to a height exceeding upper ends of the partition walls; and arranging a protecting sheet that covers the supplied liquid photosensitive material and the upper ends of the partition walls, in which a part of the supplied photosensitive material exceeding the upper ends of the partition walls is pushed off the sheet material and partition walls to allow the protecting sheet to come into tight contact with the upper ends of the partition walls.

4. The method according to claim 2, wherein the filling of the plurality of spaces with the photosensitive material comprises:

supplying the photosensitive material to a height exceeding upper ends of the partition walls; and arranging a protecting sheet that covers the supplied liquid photosensitive material and the upper ends of the partition walls, in which a part of the supplied photosensitive material exceeding the upper ends of the partition walls is pushed off the sheet material and partition walls to allow the protecting sheet to come into tight contact with the upper ends of the partition walls.

5. The method according to claim 1, wherein each of the plurality of spaces is filled by a portion of the photosensitive material, and wherein, for each of the plurality of spaces, the volume of the recess in said space is substantially equal to a volume that the portion of the photosensitive material within said space will shrink during curing.

6. The method according to claim 2, wherein each of the plurality of spaces is filled by a portion of the photosensitive material, and wherein, for each of the plurality of spaces, the volume of the recess in said space is substantially equal to a volume that the portion of the photosensitive material within said space will shrink during curing.

* * * * *